J. E. REYNOLDS.
APPARATUS FOR PREVENTING THE EMULSIFICATION OF OIL FROM WELLS.
APPLICATION FILED JUNE 23, 1915.

1,157,902.

Patented Oct. 26, 1915.
2 SHEETS—SHEET 2.

Fig. 2.

WITNESS
W. F. Drew

INVENTOR
John E. Reynolds
BY
Wm. F. Booth
ATTORNEY

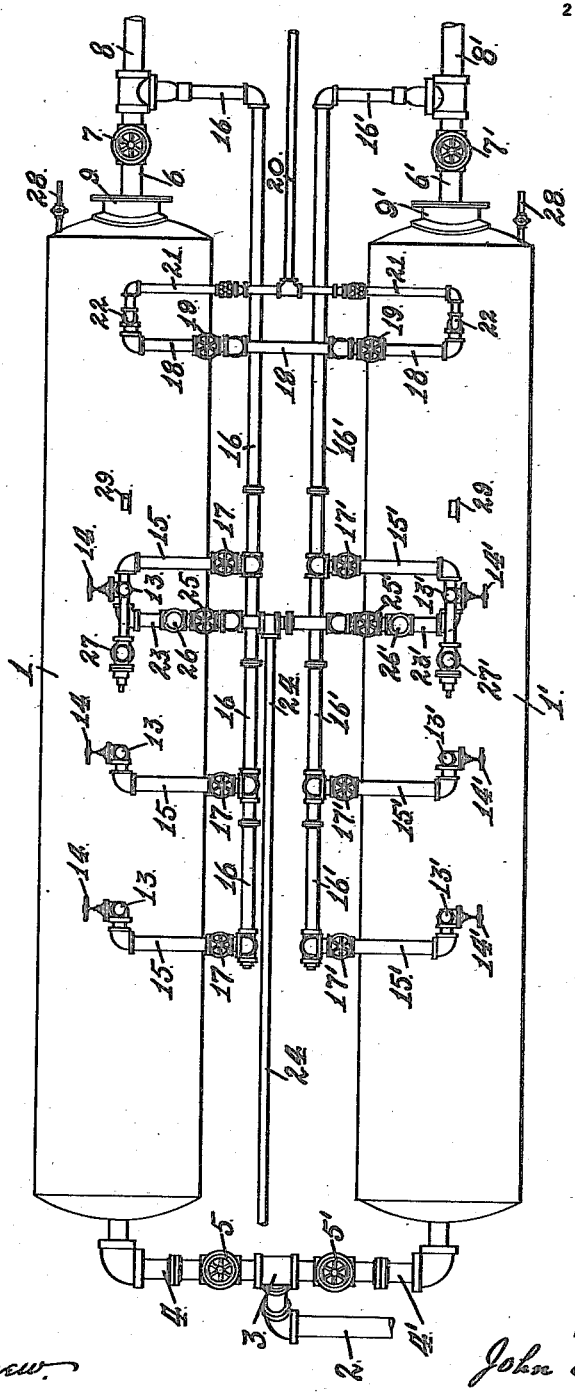

UNITED STATES PATENT OFFICE.

JOHN E. REYNOLDS, OF TAFT, CALIFORNIA.

APPARATUS FOR PREVENTING THE EMULSIFICATION OF OIL FROM WELLS.

1,157,902.   Specification of Letters Patent.   Patented Oct. 26, 1915.

Application filed June 23, 1915. Serial No. 35,951.

*To all whom it may concern:*

Be it known that I, JOHN E. REYNOLDS, a citizen of the United States, residing at Taft, in the county of Kern and State of California, have invented certain new and useful Improvements in Apparatus for Preventing the Emulsification of Oil from Wells, of which the following is a specification.

My invention relates in general to apparatus and appliances for operating oil-wells, and particularly to means effecting the flow thereof.

The essential object of my invention is to prevent the emulsification of the oil from wells producing oil and gas, or oil, gas and water in combination, and it is applicable to flowing wells or to wells caused to flow by compressed air.

To this end, my invention consists in the novel apparatus, the nature and operation of which I shall now fully describe, by reference to the accompanying drawings, in which—

Figure 1 is a plan of my apparatus. Fig. 2 is a side elevation of the same.

1 is a tight container of any suitable shape and dimensions, preferably elongated and recumbent, as this form and position yield the best results in the treatment of the well product, both with respect to the utilization of its gaseous component to form the gas cushion hereinafter described, and in the separation of the various ingredients of said product. 1' is a similar tight container.

2 is the pipe line from the well. This is connected by the elbow 3 with the branch 4 leading by a tight connection into one end of the container 1, and with the branch 4' leading, by similar connection, into the end of the container 1'. 5 is a gate valve controlling the branch 4; and 5' is a gate valve controlling the branch 4'. From the lower portion or area of the other end of the container 1 leads the oil draw-off pipe 6 controlled by a gate valve 7. A similar oil draw-off pipe 6' leads from the other end of the other container 1', and is controlled by a gate valve 7'. The draw-off pipes 6 and 6' connect with the oil lines 8 and 8' respectively which lead to the tanks or reservoirs.

In the discharge ends of the containers are the manholes 9 and 9' respectively, to permit interior inspection. From the lower portion of each container, near its discharge end, depends an inverted dome 10 from which a pipe 11, controlled by a gate valve 12, leads away to any suitable destination for the water, sand, mud and other undesirable substances.

Rising from the upper area or portion of the container 1 are gas pipes 13 which are controlled by valves 14. These pipes are to permit the escape of gas into the atmosphere when necessary. With the riser gas pipes 13 are connected the gas pipes 15 which lead to the gas line 16 which is connected into the oil line 8 which, as heretofore stated, leads to the tanks or reservoirs. Each of the pipes 15 is controlled by a valve 17. These gas pipes 13 and 15 may be in any suitable number at intervals along the length of the container. I have, for illustration, shown three. In connection with the container 1' are similarly disposed riser gas pipes 13', valves 14', pipes 15', valves 17' and a gas line 16' which latter is connected into the oil line 8'. From the upper portion of one container to the upper portion of the other container leads a pressure equalizing pipe 18 controlled by the valves 19.

20 is a water line pipe connecting into the water pipe 21 which is continued at each end as a wash pipe 22 down into the inverted domes 10 of the two containers. This is used to wash out foreign particles, such as mud and sand, etc., from said domes, if necessary.

23 and 23' are gas pipes which lead from one of the riser gas pipes 13 and 13' of the two containers, and are connected to a gas line 24. These pipes 23 and 23' are fitted with hand valves 25 and 25' and are controlled by check valves 26 and 26'. They are used for taking off surplus gas to the line 24 for commercial purposes, if desired.

27 and 27' are safety pop-valves to prevent an excess of pressure in the containers.

Valve controlled outlet pipes 28 in the end of the containers are used as gages to ascertain the height of the liquid in said containers.

29 are pressure gages.

The operation of the apparatus is as follows: The fluid from the well,—oil, gas, water, mud, sand, etc., passes through the well line 2 and branch 4, the gate valve 5 of which is open, into the container 1, the exits 6 and 11 from which, for the oil and fluent solids respectively, are closed. At this time the other container 1' is closed by its gate valve 5' to the well line, and it is also closed to the first container by the valve 19 in its equalizer pipe 18. As the well product flows into container 1, one or more of the gas exits from the top of the container are opened, the air content of said container being thus vented so that the container fills with the well product. Then the vents are closed and the pressure rises in the container. When the pressure reaches the desired point, the equalizing pipe 18 is opened by its valve 19 and gas passes over from container 1 to container 1', until the pressure in the two containers is the same, and is at the desired point. This point is reached, regulated, controlled and maintained by the proper manipulation of the valves 17 in the gas pipes 15, which permit excess of pressure to pass off through gas line 16 into the oil line 8; or, if it be desired, the pipe 23 may be used to carry the surplus gas to the gas line 24 for commercial use. There is thus established in the second container 1' a gas cushion under such pressure as may be found best to permit the well product to flow in against. When this gas cushion is established, the first container 1 is closed by its gate valve 5 to the well pipe 2, and the second container 1' is opened to said pipe by its gate valve 5'. The equalizing pipe 18 between the two containers is closed; and the oil discharge pipe 6 from the first container is opened. The well product now flows into the second container 1' against the gas cushion which has been established therein. The effect of this is to so quiet it that emulsification is prevented and the several ingredients separate effectually and may be drawn off separately. The desired effect, it will be seen, thus takes place first in the second container 1', because the operation in the first container 1 is merely to establish the first gas cushion in the second container 1', and the product first taken into first container 1 is merely to start the operation, and as a matter of fact this first batch of oil in container 1 is practically spoiled as it has been emulsified. But now the operation proceeds regularly, for the contents of the first container 1 having been drawn off, and the second container 1' having been filled with the well product, its pressure is now transferred to container 1, through the equalizer pipe 18 until the pressure, regulated and controlled as before, is the same in both, and the necessary gas cushion is thus established in the first container 1. Thereupon the operation is again reversed, the well line 2 being connected with container 1 and shut off from container 1'. The well product now flows into container 1 against the gas cushion established therein, and the separated products in container 1' are drawn off. Thus the operation continues, the well itself furnishing the necessary gas cushion alternately in each container.

In the light of the foregoing description, the following considerations will be fully understood. Heretofore the pressure and flow of flowing oil wells has been controlled either by a flow plug or a valve placed in the flowline, either at or some distance from the well, the valve or flow plug being used to reduce the aperture or diameter of the flow line for the purpose of controlling the pressure of the well. This sudden reduction has in most cases caused emulsification of the oil when used on flowing wells, which emulsification is due to the mechanical mixing of the oil, water and gas, and the resulting chemical change. The emulsified product is, in most cases, valueless unless treated in various ways at great expense, and in some cases no successful method of treatment has been found.

My invention may be used on all flowing oil wells either those producing oil and gas, or oil, gas and water in combination, or upon oil wells caused to flow by means of compressed air. When water is associated with the oil and gas, the apparatus, by reason of the cushion of gas against which the well is continuously made to flow, prevents emulsification of the product. The cushion of gas that is continuously held in the apparatus under pressure can be so regulated by valves that it will have the same effect as the above mentioned valve or flow plug commonly used, but it eliminates entirely the emulsification of the product. The apparatus makes further treatment of the oil, gas and water for the purpose of separation, unnecessary, as upon leading the product from the apparatus into reservoirs or tanks, the water can be easily withdrawn. The gas makes its way through the risers into the gas mains. The size of the containers and necessary connections of the apparatus are dependent entirely upon the amount of output of the well, and no matter how large the output may be, the apparatus can be suitably built to handle the production, and effectually cause the separation of the oil, gas, and water, without appreciable loss. Also, because of the gas cushion against which the well is at all times flowing, the life of the well will be prolonged, for the chief reason that it has a steadying effect upon the well, and eliminates all sudden and undue pressures against the well, and furthermore prevents the sucking in and breaking down of the loose containing formations encountered in many oil fields. Inasmuch as the apparatus also makes use of only the amount of gas required to keep the well steadily flowing, this conservation of the gas pressure will also tend to prolong the life of the well.

The apparatus can be used with equal success upon flowing wells producing sand, oil and gas, or sand, oil, gas and water in combination, and, in addition to securing a separation of the sand, water, oil and gas, the apparatus, by reason of its steadying effect upon the well and the open flow line obtainable, has a tendency to prevent choking of the well by any suddenly increased amount of sand.

The apparatus may be used in combination with the customary flow plug or valve if desired, and on account of the equalization of the pressure on both sides of such flow plug or valve, by reason of the gas cushion against which the well is at all times flowing, emulsification will be prevented.

By the use of this apparatus, reduction of the production of a well can be obtained by regulation of the valves without any material injury to the well.

Danger of the cutting out of fittings in wells where sand accompanies the oil and gas is greatly lessened because of the decreased friction obtained by the enlarged flow line opening allowable, because of the controlling gas cushion.

I claim:—

1. An apparatus for the described purpose, comprising a plurality of independent tight containers; a separately controllable tight inlet connection from the well line to each container; a separately controllable discharge connection for the non-gaseous contents of each container; and a controllable gas connection between the containers for establishing in each alternately a gas cushion against the flow of the well thereinto.

2. An apparatus for the described purpose, comprising a plurality of independent tight containers; a separately controllable tight inlet connection from the well line to each container; a separately controllable discharge connection for the non-gaseous contents of each container; a controllable gas connection between the containers for establishing in each alternately a gas cushion against the flow of the well thereinto; and separately controllable gas vents from each container to control the pressure therein.

3. An apparatus for the described purpose, comprising a plurality of independent tight containers; a separately controllable tight inlet connection from the well line to each container; a separately controllable discharge connection for the liquid contents of each container; a separately controllable discharge connection for the fluent solids from each container; and a controllable gas connection between the containers for establishing in each alternately a gas cushion against the flow of the well thereinto.

4. An apparatus for the described purpose, comprising a plurality of independent tight containers; a separately controllable tight inlet connection from the well line to each container; a separately controllable discharge connection for the liquid contents of each container; a separately controllable discharge connection for the fluent solids from each container; a controllable gas connection between the containers for establishing in each alternately a gas cushion against the flow of the well thereinto; and separately controllable gas vents from each container to control the pressure therein.

5. An apparatus for the described purpose, comprising a plurality of independent elongated, recumbent, tight containers; a separately controllable tight inlet connection from the well line with one end of each container; a separately controllable discharge connection for the non-gaseous contents from the lower area of the other end of each container; and a controllable gas connection between the upper areas of the containers for establishing in each container alternately a gas cushion against the flow of the well thereinto.

6. An apparatus for the described purpose, comprising a plurality of independent elongated, recumbent, tight containers; a separately controllable tight inlet connection from the well line with one end of each container; a separately controllable discharge connection for the non-gaseous contents from the lower area of the other end of each container; a controllable gas connection between the upper areas of the containers for establishing in each container alternately a gas cushion against the flow of the well thereinto; and separately controllable gas vents from the upper area of each container to control the pressure therein.

7. An apparatus for the described purpose, comprising a plurality of independent elongated, recumbent, tight containers; a separately controllable tight inlet connection from the well line with one end of each container; a separately controllable discharge connection for the liquid contents from the lower area of the other end of each container; a separately controllable inverted dome for the reception and discharge of the fluent solids from the lower area of each container; and a controllable gas connection between the upper areas of the containers for establishing in each container alternately a gas cushion against the flow of the well thereinto.

8. An apparatus for the described purpose, comprising a plurality of independent elongated, recumbent, tight containers; a separately controllable tight inlet connection from the well line with one end of each container; a separately controllable discharge connection for the liquid contents from the lower area of the other end of each container; a separately controllable inverted dome for the reception and discharge of the fluent solids from the lower area of each container; a controllable gas connection between the upper areas of the containers for establishing in each container alternately a gas cushion against the flow of the well thereinto; and separately controllable gas vents from the upper area of each container to control the pressure therein.

9. An apparatus for the described purpose, comprising a tight container; means for establishing therein a gas-cushion; a controllable inlet connection from the well line to the container to admit the well flow thereinto against the gas-cushion therein; and separately controllable discharges for the contents of the container.

10. An apparatus for the described purpose, comprising a tight container; means connecting said container with the well line for establishing in said container a cushion of gas from the well; a controllable inlet connection from the well line to the container to admit the well flow thereinto against the gas-cushion therein; and separately controllable discharges for the contents of the container.

In testimony whereof I have signed my name to this specification in the presence of two subscribing witnesses.

JOHN E. REYNOLDS.

Witnesses:
R. B. WHITTEMORE,
A. M. KEENE.